Figure 1:
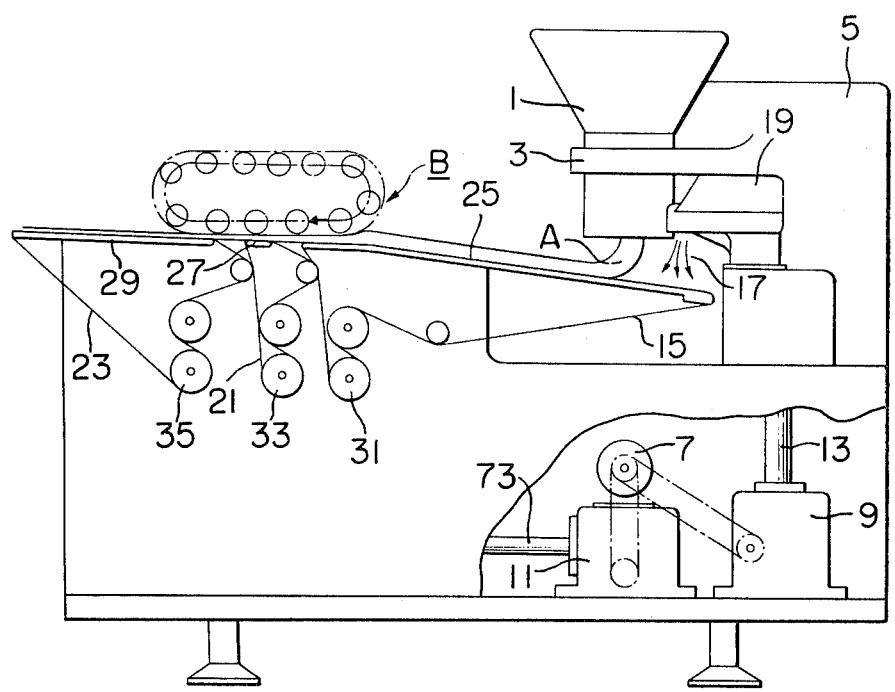

United States Patent [19]

Hayashi et al.

[11] 4,192,636
[45] Mar. 11, 1980

[54] APPARATUS FOR STRETCHING DOUGH MATERIAL

[75] Inventors: Torahiko Hayashi; Takashi Maeda; Michio Morikawa, all of Utsunomiya, Japan

[73] Assignee: Rheon Automatic Machinery Co., Ltd., Utsunomiya, Japan

[21] Appl. No.: 917,968

[22] Filed: Jun. 22, 1978

Related U.S. Application Data

[63] Continuation of Ser. No. 716,660, Aug. 23, 1976, abandoned.

[30] Foreign Application Priority Data

Aug. 22, 1975 [JP] Japan .................................. 50/102478

[51] Int. Cl.² .............................................. A21C 3/02
[52] U.S. Cl. ...................................... 425/96; 425/335; 425/373; 426/502; 426/504
[58] Field of Search .................. 425/372, 373, 337, 92, 425/96, 133.1, 335; 426/297, 501, 502, 503, 504

[56] References Cited

U.S. PATENT DOCUMENTS

| | | | |
|---|---|---|---|
| 777,349 | 12/1904 | Mitchell | 425/373 X |
| 1,134,970 | 4/1915 | Lawrence | 425/337 |
| 2,157,192 | 5/1939 | Thurlings | 425/335 |
| 2,264,115 | 11/1941 | Grainger et al. | 426/502 X |
| 2,275,714 | 3/1942 | Anetsberger et al. | 425/363 X |
| 2,888,886 | 6/1959 | Jorgenson et al. | 425/92 X |
| 3,023,714 | 3/1962 | Seewer | 425/363 X |
| 3,191,553 | 6/1965 | Rich et al. | 425/373 |
| 3,894,828 | 7/1975 | Moline et al. | 425/373 X |
| 3,973,895 | 8/1976 | Hayashi | 425/92 X |
| 4,056,346 | 11/1977 | Hayashi | 425/92 X |
| 4,113,819 | 9/1978 | Hayashi et al. | 425/373 X |

FOREIGN PATENT DOCUMENTS

| | | | |
|---|---|---|---|
| 721531 | 11/1965 | Canada . | |
| 2501446 | 10/1975 | Fed. Rep. of Germany | 425/373 |
| 2600463 | 9/1976 | Fed. Rep. of Germany | 425/133.1 |
| 2601883 | 2/1977 | Fed. Rep. of Germany | 425/373 |
| 388967 | 8/1908 | France . | |
| 23998 | of 1910 | United Kingdom | 425/372 |
| 714375 | 8/1954 | United Kingdom | 425/335 |
| 860154 | 2/1961 | United Kingdom | 425/335 |

*Primary Examiner*—Philip Anderson
*Attorney, Agent, or Firm*—Guy W. Shoup; Gerard F. Dunne

[57] ABSTRACT

An apparatus for continuously stretching dough for cakes, bread and the like, comprising a plurality of rollers progressing along a closed orbit comprising a lower straight portion, a plurality of conveyor belts positioned thereunder, with the upper flights of said conveyor belts being spaced apart from each other.

8 Claims, 5 Drawing Figures

APPARATUS FOR STRETCHING DOUGH MATERIAL

This application is a continuation of application Ser. No. 716,660 filed Aug. 23, 1976 and now abandoned.

The present invention relates to an apparatus for continuously stretching dough material into a thin web.

One of the inventors of the present invention invented in the past a device as disclosed in U.S. Pat. No. 3,973,895, wherein a strip of dough material is fed into and flattened in a path formed between a group of rollers progressing along a closed orbit and a plurality of moving conveyor belts positioned underneath a lower straight portion of said closed orbit. Rotating brushes may also be provided between said conveyor belts. In the above device, the speed of each of said conveyor belts is faster than that of the nearest upstream conveyor. The rollers progress in the same direction as the movement of said conveyor belts and the rotational speed of the rollers are positively controlled by means connected to the base of the device.

The present invention relates to an improvement over the above device. The present invention concerns itself with an apparatus for continuously stretching dough for cakes, bread and the like, comprising a base; a plurality of rollers spread apart and rotatably positioned on said base in an elliptical path; a plurality of conveyor belts below said rollers arranged in series and facing the lower portion of said elliptical path; means to rotate said conveyor belts relative to said base, the speed of each of said conveyor belts being faster than that of the nearest upstream conveyor; means connected to said base to move said rollers in the same direction as the movement of said conveyor belts; and means connected to said base to positively control the rotational speed of said rollers; characterized in that the upper flight of each of said conveyor belts are spaced from one another.

The prior art does not provide any substantial space between any pair of adjacent conveyor belts or between any conveyor belt and any rotating brush or other structure adjacent thereto. When rotating brushes are employed, brushes are positioned abutting the ends of the adjacent conveyor belts.

According to the present invention, the upper flights of any pair of adjacent conveyor belts are spaced apart at a certain distance. This structure of the device has accomplished a substantial increase in stretching efficiency over the prior art.

The apparatus of the present invention is effective in stretching dough of high elasticity such as bread dough. The apparatus, by its structural characteristcs, can lessen the elasticity of dough without injuring the dough. Further, in the device of the present invention, spillage of flour attached to the lower surface of dough material moving on the conveyor belts may be avoided if any pair of adjacent conveyor belts are arranged to contact each other at a position underneath the upper flight of the upstream conveyor belt.

An object of the present invention, therefore, is to provide a dough stretching apparatus of an improved stretching efficiency.

A further object of the present invention is to provide a dough stretching apparatus of a structure wherein flour attached to the lower surface of dough material being stretched is continuously and effectively utilized while dough material is stretched efficiently.

The above and other objects, features and advantages of the invention will be apparent in the undermentioned detailed description.

Figure 2:
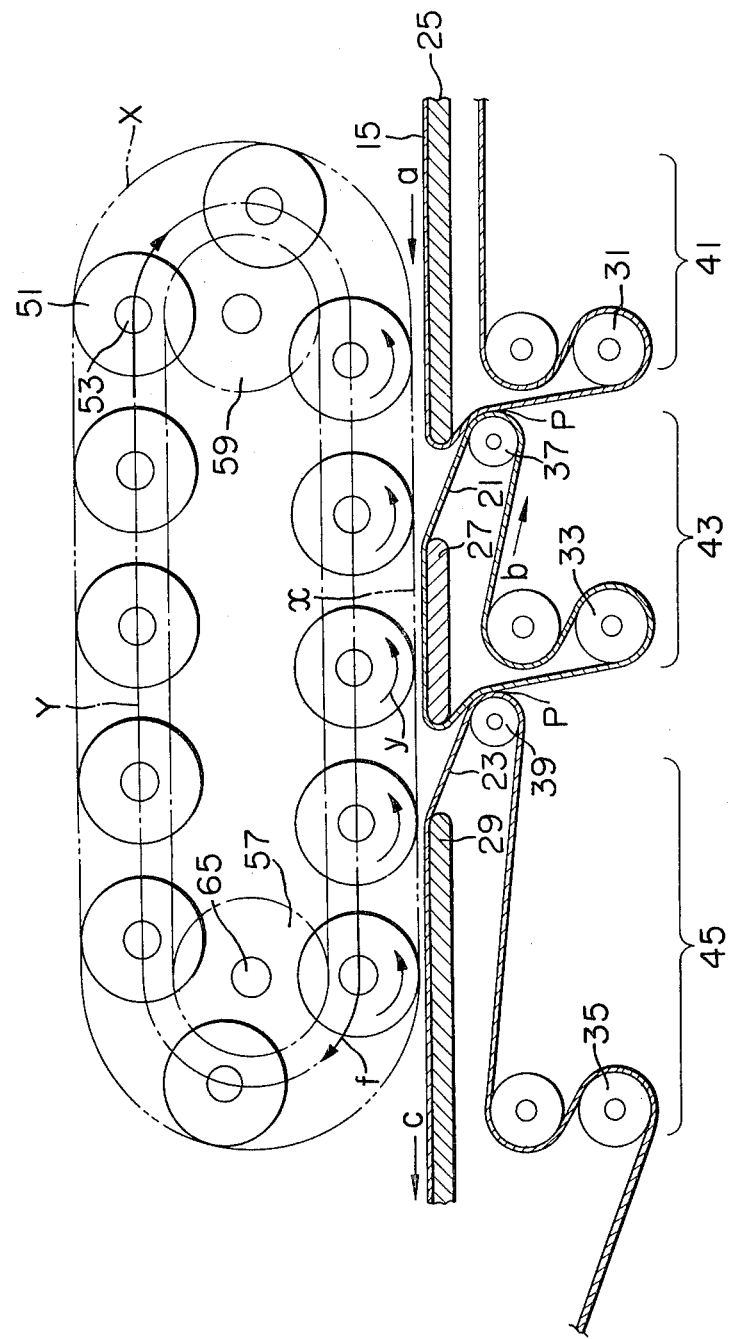
Figure 3:
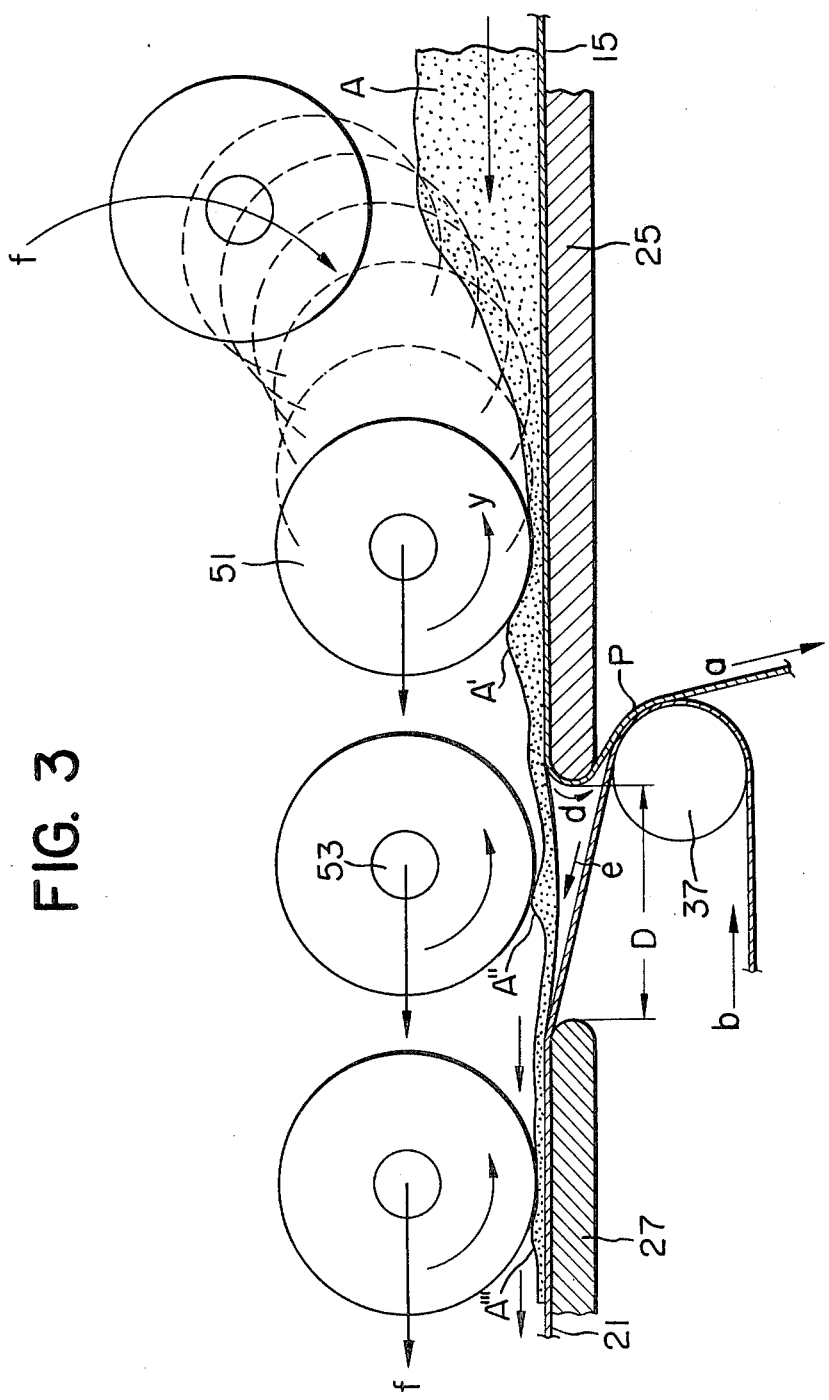
Figure 4:
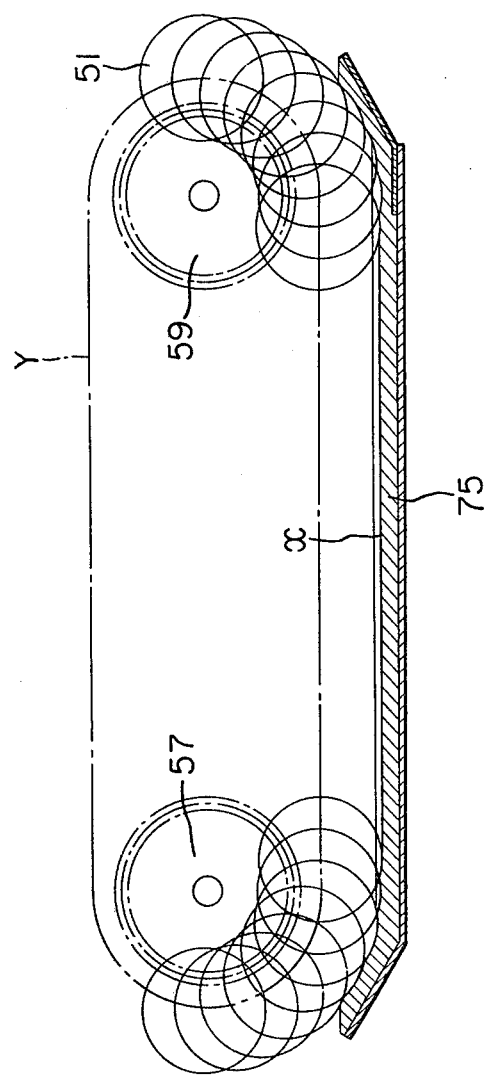
Figure 5:
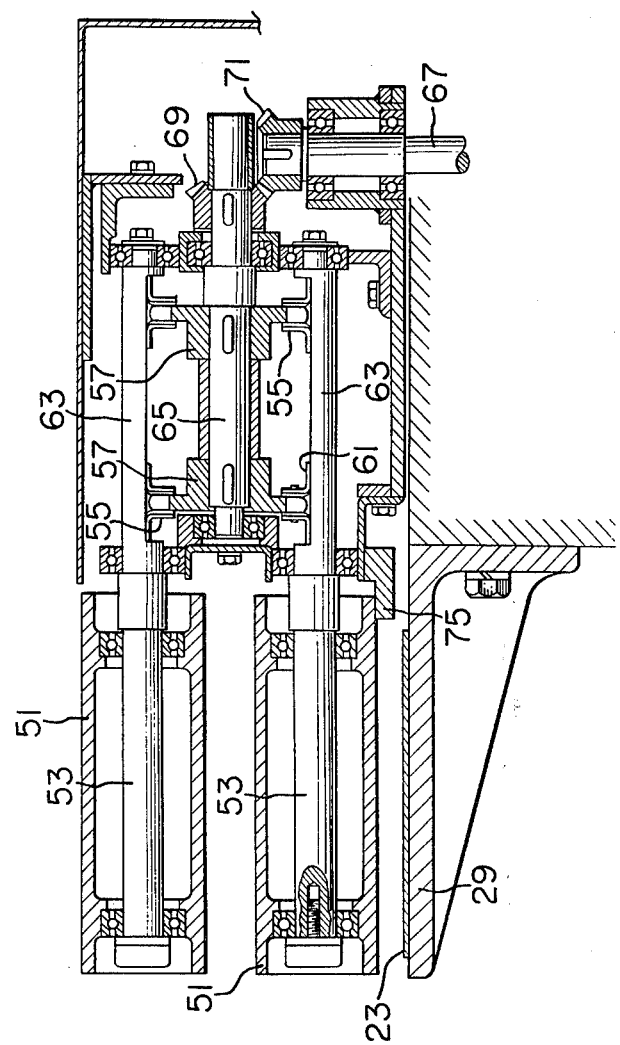

For a better understanding of the invention, reference will now be made by way of example to the accompanying drawings, in which:

FIG. 1 is a diagrammatic side view, partially broken away, showing an embodiment of an apparatus of the present invention and a dough feeder used therewith, FIG. 2 is a diagrammatic cross-sectional side view of a conveyor assembly associated with a roller assembly, FIGS. 3 and 4 are diagrammatic views of movements of certain of the components, and FIG. 5 is a cross-section of the drive mechanism for said roller assembly.

Referring now to FIGS. 1 through 3, a dough feeder 1 is positioned in a support 3 integral with the frame 5 of the apparatus. The power of a drive motor 7 is transmitted simultaneously through pulleys to reduction gears 9 of a vertical output spindle type and reduction gears 11 of a horizontal output spindle type.

The output spindle 13 of the reduction gears 9 is operatively connected to an extruder (not shown) provided in the dough feeder 1 so that dough material A is continuously extruded therefrom.

The dough material A may be extruded in the form of a sheet, solid rod or hollow rod, as the case may be.

Dough material A thus extruded is received by a first conveyor belt 15 which is preferably inclined slightly upwardly in the downstream direction. The upper surface of the first conveyor belt 15 is strewn with flour 17 by a flour feeder 19 mounted on the frame 5 at a suitable position upstream of the dough feeder 1. Consequently, the extruded dough material A is laid on the conveyor belt 15 already strewn with flour.

Dough material A is then carried forward on the conveyor belt 15 to the apparatus of the present invention where it is stretched to a thin web by a group or rollers 51 co-operating with a conveyor assembly positioned thereunder consisting of a plurality of conveyors 41, 43, and 45.

The first conveyor 41 comprises the conveyor belt 15, which receives dough material A extruded from the dough feeder 1. The conveyor 41 further comprises a support plate 25 and three rollers. The support plate 25 supports the upper flight of the conveyor belt 15. One of the three rollers, designated by the reference number 31 in FIG. 1, is a drive roller, which moves the conveyor belt 15 in the direction of the arrow a in FIG. 2. The drive roller 31 is positioned underneath the support plate 25.

The second conveyor 43 has a similar structure as that of the conveyor 41 and comprises a conveyor belt 21, a support plate 27 and three rollers. The upper flight of the conveyor belt 21 is supported by the support plate 27. The upstream end of the support plate 27 is spaced apart form the downstream end of the support plate 25 of the first conveyor 41.

Thus, as illustrated specifically in FIG. 3, there is a gap D between the downstream end of the upper flight of the conveyor belt 15 in the first conveyor 41 and the upstream end of the upper flight of the conveyor belt 21 in the second conveyor 43. Roller 33 is a drive roller, which moves the conveyor belt 21 in the direction of the arrow b in FIG. 3 and is positioned underneath the support plate 27. Tension roller 37 is positioned at the upstream end of the conveyor 43 offset in the upstream direction from the support plate 27 and below the level thereof. It is positioned such that a portion thereof comes underneath the support plate 25 of the first conveyor 41 and, consequently, underneath the upper flight of conveyor belt 15, contacting the flight of conveyor belt 15 connecting he downstream end of the support plate 25 and the drive roller 31.

The third conveyor 45 has also a similar structure and comprises a conveyor belt 23, a support plate 29 supporting the upper flight of the conveyor belt 23, and three rollers. The upstream end of the support plate 29 is spaced apart from the downstream end of the support plate 27. Roller 35 is a drive roller, which moves the conveyor belt 23 in the direction of the arrow c in FIG. 2. A tension roller 39 is positioned at the upstream end of the conveyor 45 offset in the upstream direction from the support plate 29 and below the level thereof. It is positioned such that a portion thereof comes underneath the support plate 27 of the second conveyor 43 and contacting the flight of the conveyor belt 21 connecting the downstream end of the support plate 27 and the drive roller 33.

The conveyor belt 15, after leaving the downstream end of the support plate 24, turns around it and moves downwardly in the direction of the drive roller 31 positioned underneath the support plate 25. The outer surface of the second conveyor belt 21, turning around the tension roller 37 at the upstream end of the conveyor 43, contacts on the outer surface of the conveyor belt 15 of the first conveyor 41. In the above positional relationship of the two conveyor belts 15 and 21, they come into contact with each other at a position adjacent to the peripheral surface of the tension roller 21 higher than the level of the center thereof. In other words, the second conveyor belt 21 is in contact with the first conveyor belt 15 after turning around the tension roller 37 upwardly in the direction of the arrow b and facing upwards. Thus, the two conveyor belts, where they contact each other, are positioned in a vertically overlapping relationship as illustrated at P. A similar positional relationship exists between the conveyor belt 21 of the second conveyor 43 and the conveyor belt 23 of the third conveyor 45. A portion of the outer surface of the conveyor belt 23 comes into contact with a portion of the outer surface of the conveyor belt 21 at a position adjacent to the peripheral surface of the tension roller 39 after the conveyor belt 23 turns around the upstream end peripheral surface of the tension roller 39.

In an alternative embodiment, any pair of conveyor belts may abut on each other at a position between theit respective upper flights. Also, in this case, the portion where the two conveyor belts contact should be below the level of the upper flights of said conveyor belt. The downstream end of the upstream conveyor belt may be supported by a separate support plate or a tension roller. By the above manner of contact between each adjacent pair of conveyor belts, flour sprinkled over the upper surface of the upper flight of the conveyor belt 15 can be satisfactorily transferred onto the succeeding conveyor belts. Flour on the first conveyor belt 15, when dough material is transferred from the first conveyor belt 15 to the second conveyor belt 21, falls freely from the first conveyor belt 15 in the absence of any support and is wasted. However, if the second conveyor belt 21 is in contact with the first conveyor belt 15 as in the present invention, flour, after leaving the downstream end of the upper flight of the first conveyor belt 15, falls onto the upper surface of the second conveyor belt 21 moving slightly upwardly in the direction of the upper flight of said conveyor belt supported by the support plate 27 thereunder. The arrow d represents the direction of transfer of flour from the first conveyor belt 15 to the second conveyor belt 21. The arrow e represents the direction of the travel of flour on the second conveyor belt 21. The pressurized contact between the first conveyor belt 15 and the second conveyor belt 21 adjacent to the tension roller 37 prevents flour from passing through the two conveyor belts and falling. The same as above applied to the transfer of flour from the second conveyor belt 21 to the third conveyor belt 23.

The speed of the third conveyor 45 is higher than that of the second conveyor 43, and the speed of the second conveyor 43 is higher than that of the first conveyor 41.

In FIG. 2, over and opposite to these conveyors 41, 43, 45, there is the roller assembly comprising a number of rollers 51 which may revolve on an elliptical orbit Y as described below. The rollers 51 are mounted by means of bearings around their shafts 53 so as to be freely rotatable. A housing for the rollers may be mounted to a base in any conventional way.

In FIGS. 4 and 5, an endless chain 55 is entrained around two sprockets, i.e., drive sprocket 57 and tension sprocket 59 spaced apart from each other on a horizontal plane, and is operated along an elliptical orbit containing a lower straight portion. An additional endless chain is entrained around a drive sprocket and a tension sprocket, and the two chains are provided parallel to each other the pair or drive sprockets 57 have drive shaft 65 in common, and the pair of the tension sprockets 59 have tension shaft (not shown) in common. At one end of the drive shaft 65 is provided bevel gear 69 which engages bevel gear 71. Shaft 67 of bevel gear 71 serves as the input shaft for this apparatus. Attachments 61 are attached to the chains 55, and serve to fix the chains and the extensions 63 of the shafts 53 to each other. The extensions 63 are thus caused to travel with the chains 55 along the elliptical orbit Y. It will thus be readily understood that the shafts 53, and consequently, the rollers 51 travel simultaneously with the extensions 63. The sprockets 57 are rotated by the shaft 65, which in turn is rotated by the shaft 67 through bevel gears 69, 71. The shaft 67 is operatively connected to an output spindle 73 of the reduction gears 11 through suitable means (not shown).

In FIG. 2, the elliptical locus X formed by the path of the outermost portions of the rollers 51 includes a lower straight portion x which is opposite to the upper flights of the conveyor belts 15, 21, 23.

As to the space between the straight portion x and the upper surfaces of said upper flights of the conveyor belts, the space at the downstream end of the third conveyor belt 23 is the least, and gradualy increases upstream toward the first conveyor belt 15. The space at the downstream end of the third conveyor belt 23 is substantially equal to the thickness to which dough material is to be stretched.

As shown in FIGS. 4 and 5, a friction plate 75 is disposed at a position along the lower straight portion x of the elliptical locus X such that it engages a portion of the outer cylindrical surface of roller 51 near one end thereof so as not to obstruct the passage of the dough between the straight portion x of the elliptical locus X of roller 51 and the conveyor belts 15, 21 and 23, and along the passageway of the dough. The friction plate 75 is attached to a base for the apparatus by any conventional means, such as bolts or welding. When roller 51 engages friction plate 75, the latter positively controls the rotational velocity of the former by friction therebetween. Both axial ends of friction plate 75 are preferably bent somewhat upwardly. The forward bent portion engages and starts to drive roller 51 somewhat before roller 51 enters the straight orbit portion facing the first conveyor belt 15. Roller 51 is driven to rotate around shaft 53 in the sense shown by the arrow y in FIGS. 2 and 3. The rearward end portion of friction plate 75 ceases to engage and drive roller 51 somewhat after roller 51 leaves the straight orbit portion facing the third conveyor belt 23, after completion of progress along the straight orbit portion. This provides highly favorable effects on molding of the dough.

The arrow f represents the direction of the travel of each shaft 53. The speed of the travelling motion of each shaft 53 is adapted to be higher than the speed of the conveyor belt 23.

In the operation of the apparatus, when the motor 7 is driven, the output spindles 13, 73 are simultaneously rotated about their respective axes through respective pulleys and reduction gears 9, 11. The axial rotation of the output spindle 13 is transmitted to the extruder of the dough feeder 1 to continuously extrude dough material A therefrom. The axial rotating power of the output spindle 73 is transmitted simultaneously to the input shaft 67 of the roller assembly and to each of the aforesaid conveyors through a power transmission system (not shown). As to the details thereof, if necessary, reference may be made to the description in the specification of U.S. Pat. application No. 665,326.

The dough material A extruded from the dough feeder 1 is received on the conveyor belt 15 strewn with flour by a flour feeder 19 and conveyed toward the apparatus of the present invention B.

In FIG. 5, the rotation of the input shaft 67 causes the rotation of the shaft 65 through the bevel gears 69, 71 thus causing a pair of sprockets 57 fixed around the shaft 65 to rotate. The rotation of the sprockets 57 causes a pair of chains 55 mounted in parallel around the sprockets 57, 59 to move in the direction of the arrow f. Thus, the rollers 51 connected to the chains 55 revolve along the elliptical orbit Y in the direction f. The orbit Y of the chains 55, and consequently the rollers 51, is of an elliptic form.

The rollers 51 revolving along the orbit Y, when they progress along the straight portion x, come into contact at their circumferences with the friction plate 75 to cause themselves to forcibly rotate around the shafts 53 in the sense of the arrow y.

Underneath the above-described rollers 51, are positioned the first, second and third conveyors 41, 43 and 45, the upper flights of which are arranged in series and feed dough material in the direction of arrows a, b and c, respectively. Thus, the dough material A conveyed forward on the conveyor belt 15 is subjected to a beating or pressing action as shown in FIG. 3.

If roller 51 is not caused to rotate around shaft 53 in the direction y, roller 51 would not be different from a conventional press roller, except for the fact that it is made to revolve along the orbit Y. However, since roller 51 not only revolves along the orbit Y but also rotates in the direction y around shaft 53 when it progresses along the straight portion x, the surface of dough material A is subjected to a pressing action of roller 51 which comes into contact with the dough material while it rotates around shaft 53.

Since roller 51 is in contact with dough material A while it rotates about shaft 53 during its progress along the portion x, it distributes the pressure on its surface to all points over the surface evenly. Thus, dough material A sticks little to roller 51 and is effectively stretched.

Ahead of each roller 51 in contact with dough material A there appears a bulging portion A' in the dough material A. When the bulge of the portion A' is large, the dough sheet, after stretching, may have deep wrinkles or tears. According to the present invention, such bulging portion A' is minimized. First, the rotational speed of roller 51 around shaft 53 in the direction y is controlled by the friction with the fixed friction plate 75 and not by the friction with dough material A. The rotation of roller 51 around shaft 53 regulated by friction plate 75 is effective for reducing the bulging portions A', since the rotational speed of roller 51 relative to the dough material A may be regarded as higher by the moving speed of dough material A than the rotational speed thereof relative to a stationary object, assuming the roller rotates at its stationary position. Second, the speed of revolution of roller 51 in the direction f is higher than those of the conveyor belts for transporting dough material. This also contributes to the decrease of the bulge A'.

In addition to the above, and as an important feature of this invention, the provision of the interval D further assists in decreasing the bulge. Dough material A is released from the first conveyor belt 15 at the downstream end of the belt conveyor 41 and the pressing action of roller 51 does not act on dough material at the interval D, and so roller 51 can readily pass over the bulging portion A' and exerts light contact pressure upon the top areas of the bulge while passing thereover. Also, the speed difference between the conveyor belts 15 and 21 stretches dough material between the interval D. When the interval D is very short or almost nonexistent, the speed difference between the two conveyor belts is concentrated on the narrow portion of dough material, thus resulting in rupture of the dough.

It has been found that, in some cases, the interval (D) is preferably 20 mm or longer. However, an interval of more than 70 mm may cause wrinkles in the dough material. In some other cases, these figures may vary, depending upon the nature of the dough's qualities, softness and elasticity, for example.

Dough material is most effectively stretched when it can slide on the surfaces of the belts. When dough material sticks to the belts, it cannot slide on the belts but the upper portion thereof is merely displaced relative to the lower portion thereof, and thus the dough material cannot be effectively stretched. Accordingly, it is necessary for the surfaces of the belts to be provided with a moderate amount of flour thereby to be kept under a slidable condition. In accordance with a further feature of the present invention, the surface of the conveyor belt (15) which faces downwards after turning at its downstream end is made to come into contact (at the position (P)) with the surface of the conveyor belt (21) which faces upwards after turning around the tension roller (37) at the upstream end whereby excessive flour on the surface of the conveyor belt (15) is scraped off therefrom and transferred onto the surface of the conveyor belt (21), thus avoiding loss of flour so that the slidability of dough material on the second conveyor may be maintained.

In order to obtain the optimal sliding effect, a plurality of conveyors are provided underneath the rollers (51), which conveyors are arranged such that a downstream conveyor has a greater feed speed than that of any of upstream conveyors. The speeds of these conveyors are adjusted to correspond to or slightly exceed the stretching rate of the dough. The length of the support plate (27) and the portion of each of the support plates (25) and (29) facing the straight portion (x) should also be adjusted. If a support plate facing the straight portion (x) was excessively long, dough material would become likely to stick to the upper surface of the conveyor belt because stretching tends to expose portions of dough not sufficiently covered with flour.

It is important that the lower surface of dough material and the upper surface of the conveyor belt should always be in a sliding relationship.

The stretching effect is enhanced when the number of rollers on the elliptic orbit (Y) is increased. When the interval between any pair of adjacent rollers is arranged to be shorter than the length of any intermediate conveyor plate, even a dough material of elastic character such as bread dough can be effectively stretched. The reason for this is that the dough material is held in a stretched condition by a pair of adjacent rollers for a certain length of time whereby the elasticity of the dough is lessened and it recovers little of its thickness before stretching. Since the rollers (51) progress along the orbit (Y) faster than the feed speed of any of the conveyor belts, all portions of the dough material are pressed repeatedly by different progressing rollers. The repetition of the above pressing operation effectively stretches a dough material of elastic character.

Thus, the dough material (A) may be stretched to a thin strip such as of a thickness of 1 mm through the stretching operation of the apparatus of the present invention before it leaves the downstream end of the apparatus.

According to a test conducted using a dough material consisting of a mixture of 30 weight parts of egg, 50 weight parts of sugar and 100 weight parts of wheat flour, the dough material was fed to the apparatus of the present invention in the form of a sheet 50 mm thick. The dough material was stretched to a thickness of 1 mm in one operation. The stretching efficiency in terms of the original thickness against the resulting thickness was 50.

Further, an apparatus of a similar structure, except that brush rollers are provided between each adjacent pair of conveyor belts as disclosed, for example, in one embodiment in U.S. Pat. No. 3,973,895, was employed to stretch dough material. The apparatus failed to stretch dough material to a thickness of 2 mm in one operation without causing injury to the stretched dough material. The difference in efficiency between the above apparatus and the apparatus of the present invention apparently results from the presence of the brush rollers. When the prior art apparatus was operated continuously for a substantial length of time, the brush rollers were clogged with flour and the flexibility of the brush bristles was lost. This prevented the portion of dough at the intervals D from being sufficiently stretched.

Although the preferred embodiment of the present invention has been illustrated and described, it will be apparent to those skilled in the art that various changes and alterations may be made therein without departing from the spirit of the invention and the scope of the appended claims. For instance, the conveyor assembly may contain a greater number of conveyors. In fact, a higher efficiency may be obtained the more conveyors that are employed opposite to the straight portion of the locus of the rollers.

What is claimed is:

1. An apparatus for stretching dough for cakes, bread or the like, comprising:
   (a) means including a plurality of serially arranged conveying members adapted to underlie and support said dough for carrying it along a predetermined path,
   (b) a plurality of rollers moveable in unison along a closed roller path having a straight lower portion spaced above and along each of said conveying members, said rollers during their movement along said lower portion being in contact with the dough moving along said predetermined path, and
   (c) means operatively associated with said rollers for moving them laterally along said lower portion in the same direction as and at a speed greater than that of said dough so as to compress and stretch it,
   (d) each of said conveying members being constituted by an upper flight of a respective conveyor belt, said belts each moving at a speed greater than that of the nearest upstream conveyor belt so as to stretch said dough in regions between upper flights of adjacent conveyor belts, the upper flights of adjacent conveyor belts being spaced from one another sufficiently so as to provide said regions with a length throughout which the stretching by said belts can be distributed while the regions are unsupported from below so as to receive only a light contact pressure from said rollers as they pass thereover.

2. An apparatus according to claim 1, in which the distance between the centers of any pair of adjacent ones of said rollers is shorter that the length of the shortest of the upper flights of said conveyor belts.

3. An apparatus according to claim 1, including means for rotating each of said rollers during its contact with said dough at a peripheral speed independent of the speed of travel of said dough and in a direction opposite to that of the lateral movement of said rollers.

4. An apparatus according to claim 1, the upper flight of adjacent conveyor belts being spaced from about 20 mm to about 70 mm from one another.

5. An apparatus according to claim 1, said conveyor belts each being in sliding contact with each conveyor belt adjacent thereto, said contacting occurring at positions below said predetermined path.

6. An apparatus according to claim 1, said conveyor belts each being in sliding contact with each conveyor belt adjacent thereto, said contacting occurring at positions below the upper flight of the upstream conveyor belt of every two adjacent conveyor belts.

7. An apparatus according to claim 1, further comprising means for supplying flour to the upper surface of the most upstream conveyor belt prior to its receiving said dough, said conveyor belts each being in sliding contact with each conveyor belt adjacent thereto, said contacting occurring at positions below said predetermined path thereby enabling a transfer of flour from belt to belt to maintain a sliding relationship between the dough and each of said belts.

8. An apparatus according to claim 1, further comprising means for supplying flour to the upper surface of the most upstream conveyor belt prior to its receiving said dough, said conveyor belts each being in sliding contact with each conveyor belt adjacent thereto, said contacting occurring at positions below the upper flight of the upstream conveyor belt of every two adjacent conveyor belts, thereby enabling a transfer of flour from belt to belt to maintain a sliding relationship between the dough and each of said belts.

* * * * *